United States Patent [19]

Fathauer et al.

[11] 4,153,877
[45] May 8, 1979

[54] MOBILE CB TRANSCEIVER

[75] Inventors: George H. Fathauer; Wayne L. Holst, both of Mesa, Ark.

[73] Assignee: Masco Corporation of Indiana, Taylor, Mich.

[21] Appl. No.: 877,448

[22] Filed: Feb. 13, 1978

[51] Int. Cl.² .............................................. H04B 1/40
[52] U.S. Cl. ..................................... 325/25; 325/171; 325/452
[58] Field of Search ........................ 325/15, 16, 17, 21, 325/22, 25, 416, 419-423, 453, 452, 455, 459, 464, 465; 179/178, 179; 325/111, 171, 176

[56] References Cited

U.S. PATENT DOCUMENTS

| | | | |
|---|---|---|---|
| 3,943,451 | 3/1976 | Stoddard | 325/455 |
| 3,968,440 | 7/1976 | Ehni | 325/455 |
| 4,013,957 | 3/1977 | Tojo | 325/25 |
| 4,032,844 | 6/1977 | Imazeki | 325/25 |
| 4,092,594 | 5/1978 | Baker | 325/25 |

Primary Examiner—Robert L. Griffin
Assistant Examiner—Michael A. Masinick
Attorney, Agent, or Firm—Leon E. Redman

[57] ABSTRACT

A mobile citizens band radio transceiver having the circuitry partitioned so as to permit the chassis housing the receiver circuitry, transmitter circuitry and frequency synthesizer circuitry to be installed in a remote location in a motor vehicle such as behind the dashboard, under the seat or in the trunk thereof, or the like, so as to reduce the possibility of theft and/or the likelihood that the chassis could cause injury to the occupants of the vehicle in the event of an accident or sudden stop by efficiently housing all of the control circuitry in a combination microphone and control unit adapted to be held in the hand of the operator of the vehicle and operated by the same hand which is holding the combination unit. By having all of the controls located in the microphone, a jack plug arrangement or the like can be utilized so that the microphone can be easily removed when the operator is not in the vehicle so that no sign of the presence of the CB radio will be visible to a potential thief. The partitioning of the circuitry between the controls in the microphone and the frequency synthesizer located on the remote chassis is enabled by the use of a memory in the control circuit for storing data words corresponding to the various CB radio frequency channels to be selected, manually-operable channel selection circuitry for addressing a given word in the memory and circuitry for serially transmitting the data word indicative of the selected channel to the remotely located frequency synthesizer thereby significantly reducing the size and number of electrical connections therebetween. The remotely located frequency synthesizer serially receives the stored control word and uses one or more portions thereof to preset counters in the frequency synthesizer circuitry so as to operate a phase-locked loop at precisely the given channel selected by the operator.

27 Claims, 6 Drawing Figures

MOBILE CB TRANSCEIVER

BACKGROUND OF THE INVENTION

1. Field of the Invention

The present invention relates generally to mobile CB transceiver systems and, more particularly, to an improved mobile CB transceiver system having the circuitry partitioned such that the receiver, transmitter and frequency synthesizer circuits may be located in a remote position while the control circuitry is housed in a readily accessible combination transducer and control unit.

2. Description of the Prior Art

Many conventional radio receivers are provided with a microphone and the circuitry necessary to transmit or broadcast a radio signal modulated with audio frequency information, usually in the form of human speech, and such radios are usually referred to as "citizens band", "CB" or "two-way radios" or, more generically, "transceivers". For a number of years, such transceivers have been available in motor vehicles to enable the driver of the vehicle, while driving, to communicate with a person having a similar transceiver either at a stationary location or in another vehicle for information, entertainment or emergency purposes.

Recently, the use of mobile transceivers has gained in popularity to a point where a large percentage of both cars and trucks on the road today are equipped with CB radios which are usually purchased separately and installed adjacent to or under the vehicle's dashboard and away from the steering wheel column where space is a little more plentiful and the transceiver cabinet will not significantly interfere with the driver's operation of steering, braking, accellerating or other vehicle control functions. Such a location permits the driver to hear received radio messages but, for messages he wishes to transmit, a microphone is attached to the transceiver by an electrical cord or cable of suitable length and the driver will normally steer the vehicle with one hand while he holds the microphone close to his mouth with the other hand so that he can transmit messages.

As the popularity of CB radios increased, concern over the likelihood that a bulky transceiver chassis mounted adjacent the dashboard could cause injury to the occupants of the vehicle in the event of an accident or sudden stop grew. Another potential safety hazard exists where the control dials for channel selection, volume control, squelch and the like are located on the transceiver unit itself since the operator, in attempting to adjust transmission and/or reception or change channels would be forced to reach over to the installed location, possibly taking his eyes off the road and causing an accident, or the like. Therefore, it has become even more essential to locate all possible controls for channel selection, transmit/receive, volume control, squelch control, and the like, within easy reach of the operator to avoid the occasions or near occasions of such accidents. This development evolved into the modern attempts to make a commercially feasible "controls in the microphone" control unit such as that illustrated in U.S. Pat. No. 4,032,844 wherein at least some of the controls were located in the mike.

Furthermore, as the market for CB radios increased, the likelihood of theft of a CB transceiver from an unattended vehicle greatly increased causing an increase in the economic loss to the vehicle owner due to either damage to the vehicle caused by forcible entry for the purpose of stealing the radio or simply due to the loss of the radio itself. Therefore, the need to disguise or hide as much of the CB radio as possible evolved as did the need for locating the main chassis where it would not be likely to cause harm or injury to the occupants of the vehicle in the event of an accident or the like.

However, prior art systems are significantly hindered by the type and number of controls actually located in the combination microphone, speaker and control unit due to the large number of electrical cables or other interconnections required between the control unit and the receiver circuitry, transmitter circuitry, and frequency synthesizer circuitry located on a remotely positioned chassis, particularly since the advent of forty-channel CB radios.

Prior attempts at arriving at an optimal partitioning of the circuitry between the remotely located chassis and the control microphone have been relatively unsuccessful. In some attempts, channel selection data was entered by dialing or otherwise selecting the channel by means actually located on the remote chassis thereby defeating the main purpose of the controls-in-the-mike concept or else the channel selection was made at the microphone and transmitted to the remotely located frequency synthesizer circuit by parallel data transmission techniques which required a costly, cumbersome and relatively complex network of many electrical cables or interconnections therebetween.

Thus, a relatively simple, inexpensive, trouble-free system was required wherein the microphone control unit combination could be quickly and easily installed and removed and the chassis containing the frequency synthesizer, receiver circuitry and transmitter circuitry could be hidden in a remote location so that no trace of the CB radio could be seen with the antenna removed or withdrawn thereby reducing the danger of theft and minimizing the danger due to accidents or the like. The present invention provides such a system and employs programmable memory means in the microphone control unit addressable by manually operable channel selection means and uses the serial transmission of channel selection data to the remotely located frequency synthesizer circuit for minimizing the number of electrical connections therebetween thereby solving or at least minimizing nearly all of the problems of the prior art systems.

SUMMARY OF THE INVENTION

The mobile citizens band transceiver system of the present invention employs a chassis adapted to be installed in a remote location in a motor vehicle such as behind the dashboard, under the seat or in the trunk thereof or the like, so as to reduce the possibility of theft and the likelihood that the chassis could cause injury to the occupants of the vehicle in the event of an accident or sudden stop. The frequency synthesizer means is mounted on the chassis and includes a phase-locked loop circuit means responsive to given channel selection signals for generating and precisely maintaining predetermined desired radio frequencies. Receiver circuitry means is mounted on the chassis for receiving a plurality of radio frequency signals at said predetermined radio frequencies and for converting the signals into audio frequency electrical signals. Furthermore, the chassis include transmitter circuitry mounted thereon for converting input audio frequency electrical signals into transmitted radio frequency signals at ay one of a plurality of desired radio frequencies or channels.

A serial-to-parallel register means responsive to a given serially received multibit signal pattern is used for generating said given channel selection signal for operating the frequency synthesizer means and a separate control means of a size which may be selectively held and operated in a person's hand is mounted in a position within easy reach of the person operating the motor vehicle.

The separate hand-held control means includes means for storing a plurality of multibit signal patterns representative of the plurality of predetermined radio channel frequencies and a manually-operable channel selection means for selecting any one of the plurality of channel frequencies, as desired by the operator. Means responsive to the manually-operable channel selection means is used for addressing a selected one of the stored multibit signal patterns indicative of a corresponding one of the predetermined desired radio channel frequencies. A parallel-to-serial register means is used for receiving the addressed multibit signal pattern in parallel from the storage means and for outputting the multibit signal pattern sequence in a serial manner. Electrical connector means couples the separate hand-held control means to the remotely located chassis for serially transmitting the selected sequence of multibit signal patterns to the serial-to-parallel register means of the frequency synthesizer thereby significantly reducing the size and number of electrical cables or wires passing therebetween and rendering the "controls-in-the-microphone" concept commercially feasible.

In the preferred embodiment of the present invention, the separate hand-held control means includes an illuminated two-digit channel-indicating means carried thereon; a separate control means for manually selecting either the transmit or receive mode of operation; a manually-operable volume control means; a manually-operable squelch control means; and a microphone transducer circuit which can also function as a speaker in the microphone, if desired. It will, of course, be understood that these features are not critically necessary to the present invention but are further improvements thereon.

As a further feature of the transceiver system of the present invention, the hand-held control means may include a data clock for generating a sequence of clock pulses, a parallel-to-serial register responsive to the data clock pulses for controlling the rate at which the serial sequence of control data is outputted or transmitted to the frequency synthesizer and the frequency synthesizer means may include means associated with said serial-to-parallel register means and responsive to the data clock pulses for controlling the operation thereof and synchronizing the operation with the data output of the control means, the system including a separate electrical path coupling the control means to the remote located chassis for supplying the data control clock pulses to the frequency synthesizer means.

Yet further, the control means of the present invention may include means for manually entering a selected channel number corresponding to one of a plurality of predetermined channel frequencies. The channel selection means may include a digital keyboard, a manually-operable switch for selectively stepping from channel-to-channel in a sequential manner, one channel at a time, each time the switch is actuated, until the desired channel is reached, or a manually-operable switching means responsive to a continuous depression thereof for automatically cycling from channel-to-channel in a sequential manner until the desired channel is reached and the switching means is released, but any similar channel selection means can also be used.

Furthermore, the improved CB system of the present invention may include a separate memory register for storing a priority or recall channel number and may include means for automatically sampling the priority channels stored in the separate register at a periodic rate to automatically switch the receiver to the priority channel if it becomes active or it may include separate manually-operable means for by-passing the normal channel-selecting means and automatically selecting the stored recall channel from the separate register, if desired.

In the preferred embodiment of the present invention, the storage means includes a mask-programmable read-only memory and the transmitter circuit includes a semi-conductor series modulator for permitting the receiver audio and transmitter modulator functions to be completely separated, if desired.

Accordingly, the unique circuit partitioning scheme of the present invention enables a total "controls in the microphone" concept to be commercially feasible for the first time primarily, but not exclusively, due to the great reduction in the size and number of electrical interconnections between the microphone-control unit and the remotely located frequency synthesizer circuit due to serial rather than parallel transmission of channel selection signals therebetween. Other advantages and meritorious features of the present invention will be more fully understood from the following description of the preferred embodiment, the appended claims and the drawings which are briefly described hereinbelow.

DETAILED DESCRIPTION OF THE DRAWINGS

Figure 1:
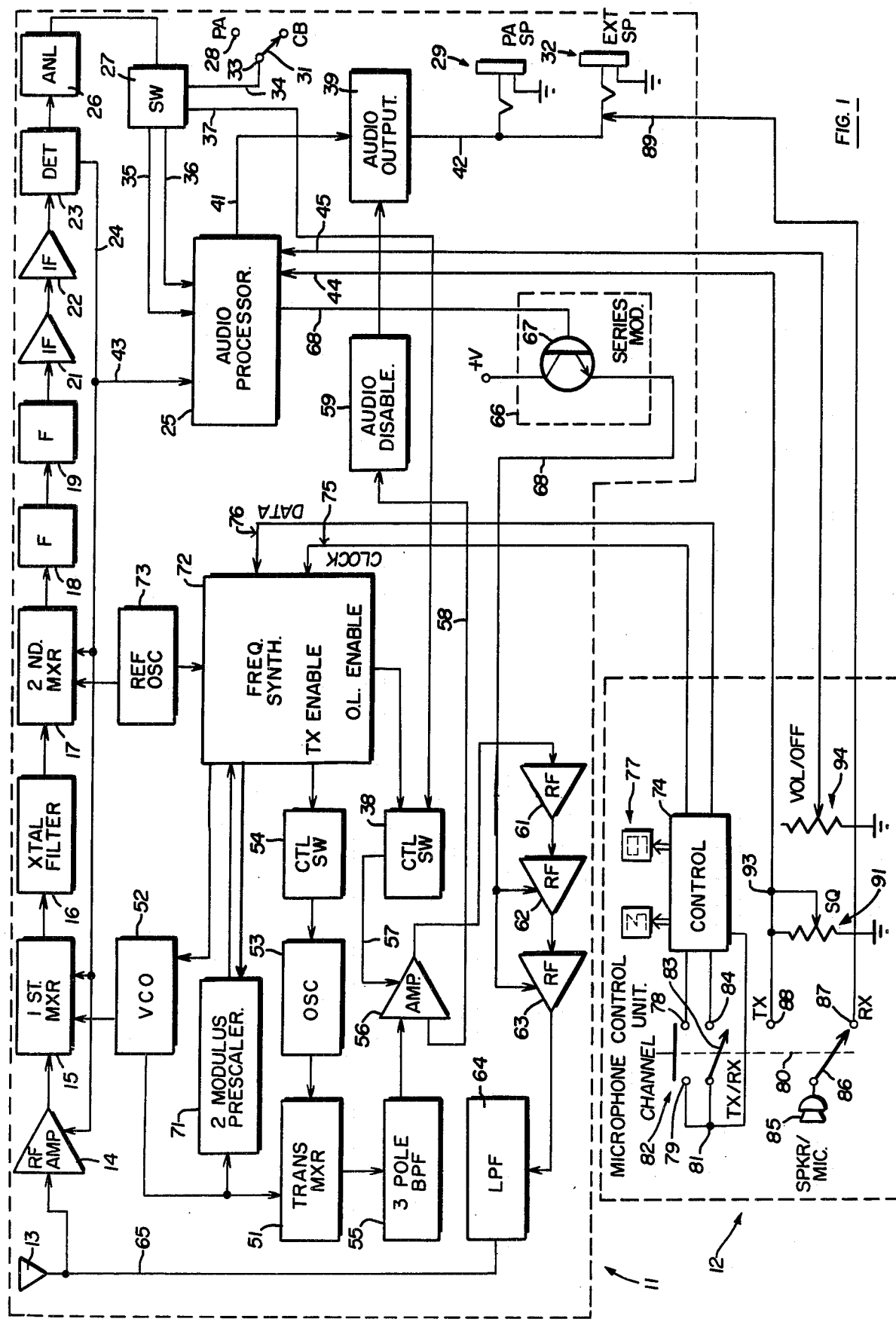
FIG. 1 is a block diagram of the improved mobile CB radio transceiver system of the present invention.

FIG. 1 shows a block diagram of the improved mobile CB radio transceiver of the present invention. In FIG. 1, the transceiver is divided into two primary sections. The first section includes a chassis, indicated by the dotted block 11, which broadly includes the radio receiver circuitry, the radio transmitter circuitry, and the frequency synthesizer circuitry to be hereinafter described. The second section of the transceiver of FIG. 1 is the combination microphone control unit which is represented generally by dotted block 12.

In the preferred embodiment of the present invention, the chassis 11 will be installed or located in a remote, out-of-the-way location such as behind or under the dashboard of the vehicle, under the seat, in the trunk, or the like. The chassis is located in this manner so as to avoid or minimize any chance that the operator or some occupant of the vehicle could be injured in the event of an accident, sudden stop or the like. Furthermore, the location of the chassis in a remote, out-of-the-way or concealed location reduces the likelihood of the vehicle being broken into by a potential thief so as to eliminate economic loss due to damage to the vehicle or direct loss from theft of the radio.

On the other hand, the microphone control unit 12 is generally installed within easy reach of the vehicle operator and connected via a jack plug or the like so a socket assembly behind the dashboard or some similar out-of-the-way location and suspended adjacent thereto so as to be easily picked up by the operator for use. The microphone control unit 12 is adapted to be held in a person's hand and operated, as hereinafter described, by one or more fingers of that hand so that the operator is able to pay more attention to driving his vehicle thereby reducing the risk of accidents and the like. The plug and socket connection of the microphone control unit at its installed location is such that it may be unplugged or pulled out of the socket when not in use and taken with the operator or stored in the trunk, or the like, so that, in the absence of a tell-tale CB radio antenna, no potential thief is able to discern that the vehicle is equipped with a CB radio and therefore a likely candidate for theft or vandalism. The socket connection is coupled to the circuitry mounted on the chassis 11 via a slim cable having a minimal number of electrical connectors associated therewith.

The chassis 11 of FIG. 1 includes conventional radio receiver circuitry mounted thereon for receiving a plurality of radio frequency signals at preselected channel frequencies and converting them into audio frequency electrical signals. The receiver circuitry of FIG. 1 includes a conventional antenna or antenna jack 13 for receiving broadcasted radio frequency signals and supplying them to a conventional RF amplifier circuit 14. In the preferred embodiment of the present invention, the antenna 13 is a hidden or hideaway model for theft prevention purposes.

The amplified output of the RF amplifier circuit 14 is supplied to a conventional first mixer circuit 15 whose output is then supplied to the input of a two pole band pass filter 16. In the preferred embodiment of the present invention, the two pole band pass filter 16 is a highly accurate 10.295 MHZ crystal filter and the output of the two pole filter 16 is supplied to the input of a second conventional mixer stage 17. The output of the second mixer stage 17 is supplied to the input of a first four pole filter network 18 whose output is connected directly to the input of a second four pole filter network 19. In the preferred embodiment of this invention, the filters 18 and 19 are designed to operate at 455 KHZ.

The output of the filter network 19 is supplied to the input of a first IF amplifier stage 21 whose amplified output is connected to the input of a second conventional IF amplifier stage 22. The IF amplifiers 21, 22 are, in the preferred embodiment of the present invention, designed to operate at 455 KHZ and are conventionally known. The amplified output of the second IF amplifier 22 is connected to the input of a conventional detector circuit network 23 which includes a conventional level detector circuit and automatic gain control detection circuitry together with appropriate RC filter circuitry therefore. The amplified output of the second IF amplifier 22 is detected or demodulated and rendered into an audio frequency electrical signal in the conventional detector circuit of block 23. One portion of the output of the detector of block 23 is generally connected via lead 24 to the audio processor circuitry of block 25, as hereinafter described, and simultaneously to the secondary AGC inputs of the RF amplifier 14, the first mixer 15, and the second mixer 17, as known in the art and automatic gain control (AGC) is accomplished thereby.

Another portion of the output of the detector circuitry of block 23 is supplied to the input of a conventional auto noise limiter (ANL) circuit 26 whose output is supplied to a PA/CB switching circuit 27. Associated with the PA/CB switching block 27 is a PA contact 28 adapted to effect a connection to a conventional PA speaker jack, as represented by reference numeral 29, or the like and a CB contact 31 adapted to effect a connection to an external speaker, as represented broadly by reference numeral 32. A manually positionable PA/CB switching arm 33 may be selectively positioned between PA contact 28 and CB contact 31, as desired, and the switching arm 33 is connected to a port of the switching block 27 via lead 34. In the preferred embodiment of the present invention, the switching circuit of block 27 is a conventional integrated circuit transmission gate such as a MC 14016 which controls the receiver audio, the PA audio, and the transmission disable function when in the PA position, as known in the art. One output from the transmission gate or switching block 27 is connected to an audio frequency amplifier in the conventional audio processor of block 25 via lead 35 while another switching port 36 is connected to the speech amplifier circuitry of the audio processor 25 and a last output of the switching circuit of block 27 is connected via lead 37 to the PA/CB out-of-lock switch of block 38 as hereinafter described.

The audio processor of block 25 may be any conventional audio processor such as a Royce C594 or the like which processes the incoming signals and outputs an audio frequency electrical signal to the audio output circuitry of block 39 via lead 41. The audio output circuitry of block 39 is a conventional five watt audio amplifier such as a Royce C599 or the like which amplifies the incoming audio frequency signal and outputs an amplified audio frequency signal on lead 42 to the PA speaker 29 or to an external speaker 32, as known in the art. In the preferred embodiment, the external speaker 32 may be hidden behind the dashboard or the like or could be the conventional radio speaker already provided in the vehicle. Lastly, the audio processor circuitry of block 25 may include an input such as lead 43 for receiving an AGC control signal, an input such as lead 44 for receiving a squelch control signal from the combination unit 12 and an input such as lead 45 for receiving a conventional volume control signal from the combination unit 12.

While specific functions or circuits have been described for illustrating the receiver circuitry of the transceiver of the present invention, it will be understood by those skilled in the art that any suitable conventional receiver circuitry may be utilized and that the specific circuitry cited is for illustration only and is not meant to limit the scope of the present invention.

Similarly, the transmitter circuitry is also mounted on the chassis 11 and may be generally thought of as including the following conventional circuit items. A transmitter mixer circuit 51 has one if its inputs connected to the output of a conventional voltage controlled oscillator (VCO) 52 which, for the purposes of description herein, is described as being associated with the frequency synthesizer circuitry hereinafter described with reference to FIG. 5, and its other input adapted to receive the output of a transmitter oscillator circuit 53 such, as a conventional 10.295 MHZ oscillator whose operation is controlled by means of a TX oscillator control switch, as represented by block 54 and described in greater detail with respect to FIG. 6.

The output of the transmitter mixer 51 is supplied to the input of a conventional three pole 27 MHZ band pass filter 55 whose bandwidth limited output is supplied to the input of a conventional buffer amplifier circuit 56. The buffer amplifier stage 56 may be selectively enabled or disabled via signals on lead 57, which is taken from the output of the control switch 38, in accordance with the out-of-lock enable logic of the frequency synthesizer circuit, as hereinafter described. One output of the buffer amplifier circuit 56 is connected via lead 58 to an audio disable circuit represented by block 59 which represents a conventional transistor switch which shuts off the bias to the input of the audio output amplifier of block 39 whenever the control switch 38 is turned on.

The primary output of the conventional buffer amplifier 56 is connected to the input of a first conventional RF driver circuit 61 whose amplified output is connected to the input of a second conventional RF driver circuit 62 whose input is, in turn, connected to the input of a third and final conventional RF driver circuit 63. The properly amplified output of the third and final RF driver circuit 63 is connected to the input of a conventional low pass harmonic filter 64 whose output is connected via lead 65 to the conventional antenna or antenna jack 13 previously described.

The last portion of the transmitter circuitry of the transceiver of FIG. 1 includes an unconventional series modulator 66 coupled between the audio processor of block 25 and the modulation signal inputs of the RF driver circuits 62 and 63 respectively. The series modulator of block 66 includes a transistor 67 having its base electrode connected via lead 68 to the output of a high gain amplifier of the conventional audio processor circuit of block 25. The collector electrode is connected through conventional filtering circuitry, if desired, to a source of DC potential such as a +13.8 volt source while the emitter electrode is connected via lead 68 to the secondary or modulation signal inputs of the RF driver circuits 62 and 63 as previously described.

The use of the series modulator 66 in the transmitter circuitry of the CB transceiver of the present invention allows separation of the transmitter audio processor 25 and the series modulator 66 used in the CB transceiver thereby permitting the receiver audio and transmitter modulator functions to be completely separated so as to eliminate the need for either high level audio switching in the combination microphone unit or the use of a relay to switch the audio at the chassis location. Furthermore, the use of the series modulator 66 eliminates the previously used expensive, bulky, and somewhat unreliable modulation transformer.

Lastly, the remotely located chassis 11 has mounted thereon, the frequency synthesizer circuitry which includes generally, the variable controlled oscillator VCO 52 of FIG. 1 whose output is connected to a second input of the first receiver mixer stage 15, to one input of the transmitter mixer 51, to the frequency input of a conventional 2-modulus prescaler 71 whose output is connected as one input of the frequency synthesizer logic of block 72. A reference oscillator 73 such as a conventional 9.84 MHZ oscillator also has its output supplied to the frequency synthesizer circuitry. A more detailed description of the structure and operation of the frequency synthesizer logic will be described hereinafter with reference to FIG. 5 wherein the frequency synthesizer logic circuit 72, the reference oscillator 73, the voltage controlled oscillator 52, and the two-modulus prescaler 71 will be discussed in greater detail and the inputs and outputs thereof similarly explained.

The combined microphone and control unit 12 is shown as including a control portion represented by block 74 which outputs a data clock signal on lead 75 to the frequency synthesizer logic of block 72 and a control data output which is connected via a single lead 76 to the control data input of the frequency synthesizer logic of block 72. Associated with the control circuit of block 74 is a two digit visual display 77 such as a pair of conventional 7-segment LED displays, or the like, and an input switching network, as briefly described hereinbelow.

One input of the control circuit of block 74 is connected directly to a first channel selection switch contact 78 while a second channel selection switch contact 79 is connected directly to a node 81. A manually-operable push button, rocker switch, or depressible switch member 82 may be selectively closed to complete a circuit path between contacts 78 and 79 or to break the contact, as desired. As hereinafter described, the switch member 82 will be used for channel selection purposes so as to enable the control circuit of block 74 to step from one selected channel to the next with each closure of the switch element 82 on the contacts 78, 79 or, alternatively, to automatically step from one successive channel to the other while the switch member 78 is held depressed so that the circuit is broken only when the switch 82 is released when the desired channel number has been selected. Node 81 is also connected directly to a switch contact 82 which is connected to the pivotal end of a manually-operable, normally-opened, transmit/receive (TX/RX) switching element 83 which may be positioned to close on switch contact 84, which is connected directly to another input of the control circuitry of block 74. Node 81 is also connected directly to another input of the control circuit of block 74 for control purposes, as hereinafter described.

As described hereinabove, the manually-operable TX/RX switching element 83 is normally maintained in the opened position. This switch is referred to as the TX/RX or transmit/receive switch and is normally operable to render the microphone control unit 12 ready to receive audio frequency electrical signals but which becomes operative to enable transmission operations when the switching element 83 is manually depressed or closed to complete a circuit path between the contacts 82 and 84, as known in the art.

A combination transducer unit which may function as both a speaker and a microphone is referred to by the reference numeral 85. The input of the transducer 85 is at the pivotal end of a rotatable switching arm 86 which is normally positioned to contact the RX switch contact 87 and whose position is controlled by the position of the manually-operable TX/RX switching element 83 previously described and as represented by the dotted line 80. Therefore, when switching element 83 is moved to the transmit position, switching arm 86 moves from the RX contact 87 to the TX contact 88 to render the transducer 85 usable as a microphone instead of a speaker, as conventionally known.

RX contact 87 is connected via lead 89 to the audio output circuit of block 39 via output port 42 for receiving the amplified audio frequency electrical signals therefrom to operate the transducer 85 as a hand-held speaker. When in the transmit mode of operation, the TX contact 88 is connected via lead 45 to one input of the audio processor, as conventionally known, and a manually positionable squelch control means, as represented by the variable resistor circuit arrangement 91, is connected to the lead 45 at node 93 for transmitting squelch control signals from the hand-held combination unit 12 to the audio processor circuitry of block 25 on the remote chassis 11. Furthermore, the variable resistor combination 94 represents the manually-operable on/off and volume control circuit means of the present invention and the output signal therefrom is connected via lead 44 from the hand-held combination unit 12 to the corresponding input of the audio processor of block 25 on the remote chassis 11.

In summary, the block diagram of FIG. 1 represents, in broad block diagram form, a conventional CB transceiver system having the digital control circuit portion and the frequency synthesizer circuit portions partitioned so as to achieve a commercially feasible realization of the controls-in-the-mike concept with all of the advantages attributable thereto.

The combination microphone and control unit of dotted block 12 of FIG. 1 is shown in considerably greater detail in the combined schematic diagram and block diagram of FIG. 2 which will now be described. The heart of the digital logic partitioning which enables the realization of the controls-in-the-mike concept in the circuit of FIG. 2 centers about the ontrol logic integrated circuit chip represented by block 101 which is shown as having 22 input or output pins or ports designated $P_1$ through $P_{22}$, respectively. The circuitry contained within the control logic chip of block 101 will be described hereinafter in greater detail with reference to FIG. 3.

Figure 2:
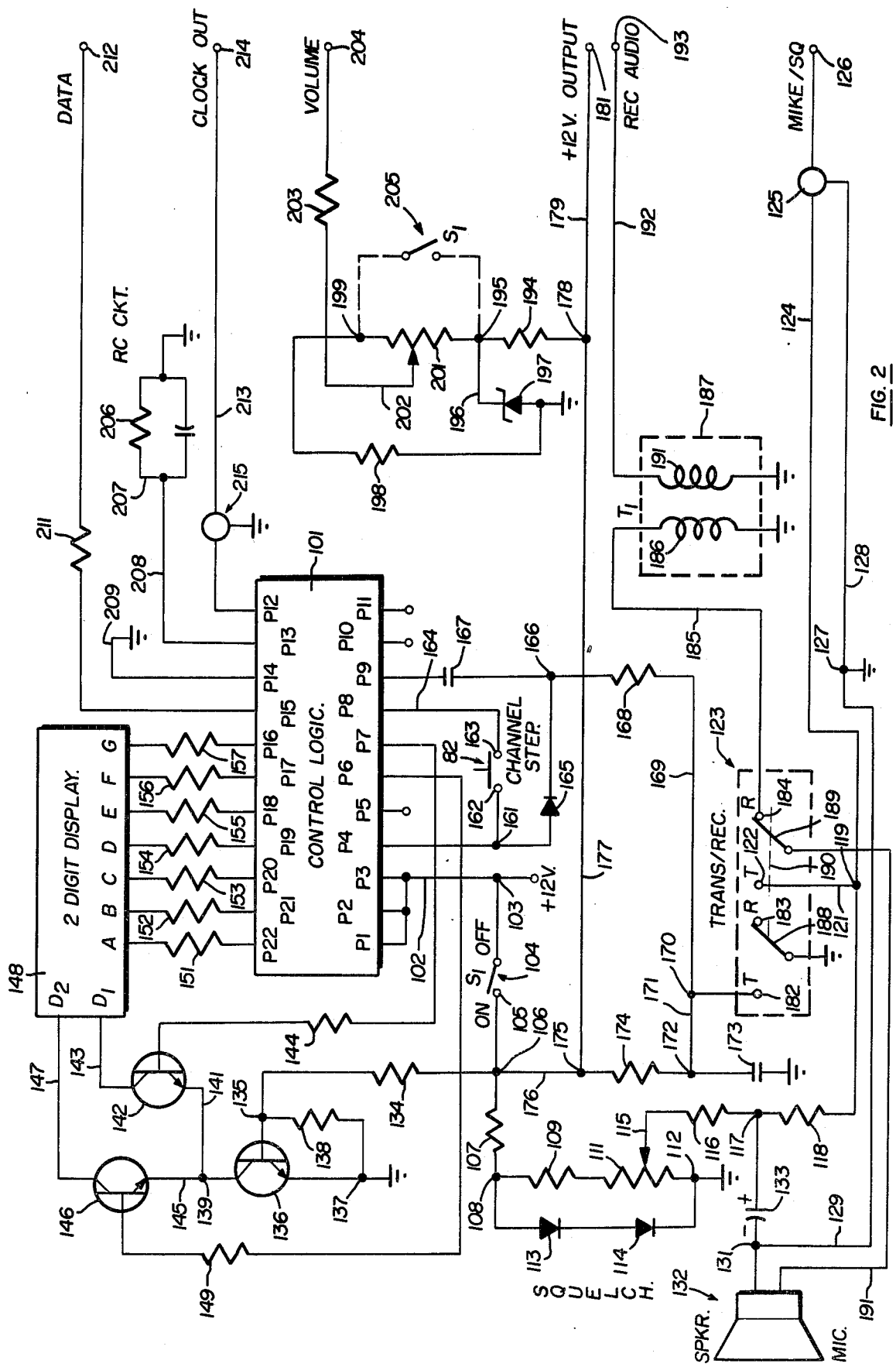
FIG. 2 is an electrical schematic diagram incorporating certain functional blocks and depicting in greater detail the microphone control unit which is represented diagramatically by the dotted block 12 of FIG. 1.

The $P_1$, $P_2$ and $P_3$ outputs are shown in FIG. 2 as being commonly coupled together and connected to a twelve volt source of potential via lead 102 and node 103. Node 103 is also connected to the pivotal arm of a manually-operable switching element 104 which may be selectively positioned to make or break contact with the "ON" switch contact 105. Switch contact 105 is connected directly to a node 106, and node 106 is connected through a resistor 107 to a node 108. Node 108 is connected through first and second parallel branches to ground. The first parallel branch includes a first series resistor 109 having one terminal connected to node 108 and its opposite terminal connected to one end of the second resistor 111 whose opposite terminal is connected via grounding node 112 to ground. Similarly, the second parallel branch includes the series combination of a first diode 113 whose anode is connected directly to node 108 and whose cathode is connected directly to the anode of a second diode 114 whose cathode is connected to ground via node 112. Resistor 111 includes a variably positionable tap or movable contact 115 which is connected to one terminal of a resistor 116 whose opposite terminal is connected to node 117 and the combination of resistors 107, 109, 111 and 116 and the diodes 113, 114 may be utilized, as indicated in the configuration shown, for generating manually-operable or controlable squelch control signals with the squelch control function being activated when the movable element or switch arm 104 of the ON-OFF/squelch switch $S_1$ is closed on contact 105 to complete a circuit path between node 103 and node 106 as previously described.

Node 117 is connected to one terminal of a resistor 118 whose opposite terminal is connected to a node 119. Node 119 is connected via lead 121 to a transmit contact point 122 which is part of the transmit/receive switching network contained within the dotted block 123, as hereinafter described. Node 119 is also connected via lead 124 through the shielded grounding cable 125 to form a mike/squelch control output at output node 126. The grounded cable 125 is shown as being connected to ground at node 127 via lead 128 and the grounded node 127 is also shown as being connected via lead 129 to the negative input node 131 of the transducer element 132 which serves as either a speaker or a microphone depending upon the position of the transmit/receive switch, as hereinafter described. Node 131 is connected to the negative plate of a capacitor 133 whose positive plate is connected to node 117. Therefore, the squelch control circuit and the microphone may be enabled by closing the switch $S_1$ by bringing the manually-positionable switching arm 104 down to complete a current path between the +12 volt node 103 and contact 105 and the squelch control signal together with the microphone audio output signal will be outputted via the mike/squelch control output node 126 as conventionally known.

Alternatively, as will be further understood by reference to FIG. 3, the switch $S_1$ or one similar thereto could be used to control the operation of the priority channel monitoring function and/or the operation of the priority channel recall function depending upon the pin connections of pins $P_2$ and $P_3$, as hereinafter described with respect to FIG. 3.

Node 106 is also connected through a resistor 134 to a base enable node 135. Node 135 is connected directly to the base electrode of a digit driver enabling switching transistor 136 whose emitter electrode is connected directly to ground through a grounding node 137. Node 135 is also connected to the grounding node 137 through a bias resistor 138. The collector electrode of the digit driver enable transistor 136 is connected directly to an output driver enable node 139 so that by controlling the signal at node 135 and therefore at the base of transistor 136, the digit driver transistors, as hereinafter described, may be controlled.

Drive enable node 139 is connected via lead 141 directly to the emitter electrode of a first digit driver transistor 142 whose collector electrode is connected via lead 143 to the first digit input $D_1$ of a conventional two digit display having seven segment numerical readouts as conventionally known. The base electrode of the digit driver transistor 142 is connected via resistor 144 directly to the output pin $P_7$ of the control logic chip 101 for strobing the first digit driver of the first digit of the display 148 at the appropriate time slot therefore.

Similarly, the drive enable node 139 is connected via lead 145 to the emitter electrode of a second digit driver transistor 146 whose collector electrode is connected via lead 147 to the second digit input $D_2$ of the two digit display represented by block 148. The base electrode of the second digit driver transistor 146 is connected via resistor 149 to output pin $P_6$ of control logic chip 101 for strobing the second digit driver and hence the second digit at the appropriate time. The seven segments of each of the conventional numerical read-outs of the two digit display 107 which are designated A, B, C, D, E, F, and G, respectively, are connected via resistors 151 through 157, respectively, to output pins $P_{22}$, $P_{21}$, $P_{20}$, $P_{19}$, $P_{18}$, $P_{17}$ and $P_{16}$, respectively, of the control logic chip 101 and all are conventional off-the-shelf-units.

The operation of a seven segment numerical display and the drivers therefore is also conventional and will not be described in any further detail herein. When the on/off mike switch $S_1$, i.e., the manually-operable switching element 104, is open to indicate that the microphone is off, the signal at the base of transistor 136 is low rendering it non-conductive. As long as transistor 136 is non-conductive, the output signals from the $P_6$ and $P_7$ terminals cannot operate the digit driver transistors 142 and 146 respectively. Therefore, the two digit display is only illuminated when the microphone is on, i.e., when the on/off mike switch has the switch element 104 closed on contact 105 to connect the +12 volt source of potential to the base of transistor 136 via node 103, switch arm 104, contact 105, node 106, resistor 134 and node 135. With the switch $S_1$ closed and a high voltage at node 135, transistor 136 conducts and pulls the collector node 139 to ground. With the driver enable node 139 grounded, any high signal from the $P_7$ or $P_6$ output of the control logic chip 101 will turn on the corresponding digit driver transistors 142 or 146, respectively, to enable the corresponding digit $D_1$ or $D_2$ of the two digit display 148 to have its seven segment read-out illuminated via the seven segment driver signals inputted via resistors 151 through 157 from pins $P_{22}$ through $P_{16}$ respectively of the control logic chip 101 as previously described.

The $P_4$ output of the control logic chip 101 is connected directly to a node 161 which is connected directly to a first channel stepping switch contact 162. A second channel stepping switch contact 163 is connected via lead 164 to the $P_8$ pin of the control logic chip 101 and a manually-operable, channel-stepping switch element 82 may be selectively depressed or released to close or open an electrical contact path between contacts 162 and 163 so that the control logic of chip 101 may step from one radio frequency channel to the next each time the element 182 completes the current path between the contacts 162, 163 or, alternatively, the control logic of chip 101 may automatically step from channel-to-channel in a step-by-step manner, sequentially, when the manually-positionable element 82 is continually depressed to maintain a current path between the contacts 162 and 163 so that when the desired channel has been reched, release of the step scan switch element 82 will stop the stepping sequence and hold the last selected channel.

Node 161 is also connected directly to the anode of a diode 165 whose cathode is connected to a node 166. Node 166 is connected to the output pin $P_9$ through a capacitor 167 and pins $P_{10}$ and $P_{11}$ are not used in the preferred embodiment of the present invention. Node 166 is also connected to one terminal of a resistor 168 whose opposite terminal is connected via lead 169 to a node 170. Node 170 is connected directly to a transmit switch contact 182 in the transmit/receive switching circuit of dotted block 123, as hereinafter described. Node 170 is also connected via lead 171 to a node 172 and node 172 is connected through a capacitor 173 to ground and through a resistor 174 to node 175. Node 175 is connected via lead 176 to node 106, previously described, and is also connected via lead 177 to a node 178. Node 178 is connected via lead 179 to a +12 volt output node since the +12 volt source of potential is connected from node 103 to the +12 volt output node 181 when the microphone switch $S_1$ is closed via the closed switching arm 104, contact 105, node 106, lead 176, node 175, lead 177, node 178 and lead 179.

The transmit/receive circuit of dotted block 123 will now be briefly described. As previously stated, a first transmit switching contact 182 is connected directly to node 170 while a second transmit switching contact 122 is connected via lead 121 to node 119. The transmit/receive circuit of block 123 also includes a first receiver contact node 183 and a second receiver contact node 184. The second receiver contact node 184 is connected via lead 185 to one end of the first coil 186 of a tranformer $T_1$ represented by the dotted block 187 and the opposite end of the first transformer coil 186 is connected directly to ground. A first manually-positionable transmit/receive switching means, also referred to as a TX/RX switch or a T/R switch, includes a manually-positionable switching arm 188 which has its moveable end normally closed on the receiver contact 183 for completing an electrically conductive path between contact 183 and ground to which the pivotal end of arm 188 is connected.

A second switching arm 189 whose position is controlled by the position of the manually-operable switching arm 188 as represented by the dotted line 190 is similarly normally positioned so that the switching arm 189 is in electrical contact with the receiver contact 184 to complete a current path between the first coil 186 of the transformer 187 and the positive input of the speaker/microphone transducer combination 132 via lead 185, contact 184, switching arm 189, and lead 191. Therefore, when the manually-operable switching arm 188 is normally positioned to the receive mode of operation, the transformer $T_1$ has its first coil connected to the positive input of the transducer 132 causing the transducer 132 to function as a speaker and when the switching arm 188 is manually moved or switched to the transmit position, the positive input of the transducer 132 is connected to the microphone/squelch control output node 126 via lead 191, switching arm 189, transmit contact 122, lead 121, node 119, and lead 124.

Similarly, the squelch control signal will be supplied to output node 126 via node 117, resistor 118, node 119 and lead 124 whenever $S_1$ is ON and the TX/RX switch is in the RX position. Simultaneously, when the transmit/receive switching arm 188 is positioned so that the switching arm 188 contacts the transmit contact 182, node 170 is connected directly to ground via contact 182 and the switching arm 188 so that the channel stepping switch contact 161 will be pulled toward ground via diode 165, node 166, resistor 168 and node 170 to prevent the changing of channels during a transmission. Furthermore, circuit means may be provided for signaling an illegal keyboard channel entry or channel change entry, which may be indicated to the user by means of a flashing of the two digit display 148, or the like, if desired. Means may also be provided for prohibiting receiver or transmitter operation if an illegal channel entry is attempted, should this be desired.

The second coil 191 of the transformer 187 has one end connected to ground and its opposite end connected via lead 192 to the receiver audio input node 193. When an amplified electrical audio frequency signal is supplied from the receiver circuitry on the remotely located chassis 11 of FIG. 1, it is supplied via the audio output circuit of block 39, leads 42 and 89 to the receiver audio input node 193, and the signal inputted thereto is transformed for impedance matching purposes and the like by the action of transformer 187 and then outputted via the coil 186, lead 185, contact 184, switching arm 189, lead 191 and the speaker function of transducer 132 to render the audio frequency electrical signals into audible sound, as conventionally known.

The +12 volt output node 181 is also connected via lead 179 to node 178 as previously described and node 178 receives the +12 volt source of potential from lead 177 whenever the on/off switch $S_1$ is closed as heretofore described. Node 178 is connected to one terminal of a resistor 194 whose opposite terminal is connected to a node 195. Node 195 is connected via lead 196 to the cathode of a zener diode 197 whose anode is connected directly to ground. The grounded anode of the zener diode 197 is also connected to one terminal of a resistor 198 whose opposite terminal is connected to a node 199. Node 199 is connected to node 195 through a resistor 201 and a positionable voltage tap 202 which may be selectively adjusted up and down the resistor 201 for manually-operable volume control purposes is connected through a resistor 203 to a volume control output node 204, as conventionally known. A manually-operable switching element 205 may, as indicated by the dotted lines between the switch element and the switch contact, be connected between nodes 199 and 195 for by-passing the volume adjustment control comprising resistor 201 and adjustable voltage tap 202 for separate on/off type control, if desired.

An RC oscillator circuit comprising the parallel combination of a resistor 206 and a capacitor 207 is connected between ground and a node 208 so as to supply an oscillator or clock signal to the clock input pin $P_{13}$ via lead 208 for use as hereinafter described. Pin $P_{14}$ is connected directly to ground via lead 209 and pin $P_{15}$ is connected through a resistor 211 to a control data outut node 212. Similarly, output pin $P_{12}$ is connected via output lead 213 to a clock pulse output node 214 and the reference numeral 215 indicates that, in the preferred embodiment of the present invention, a shielded cable to ground is normally associated with the clock output lead 213, as conventionally known.

With this brief description of the speaker/microphone transducer 132, the various manually-operable switching means, the digit driver control circuitry, volume control circuitry and squelch control circuitry, all of which are conventional at least in non-partitioned CB transceiver systems, having been described, a more detailed description of the digital control logic of chip 101 will now be given by describing the block diagram of FIG. 3 and referring, where appropriate, to the associated combination microphone and control unit circuitry of FIG. 2.

Figure 3:
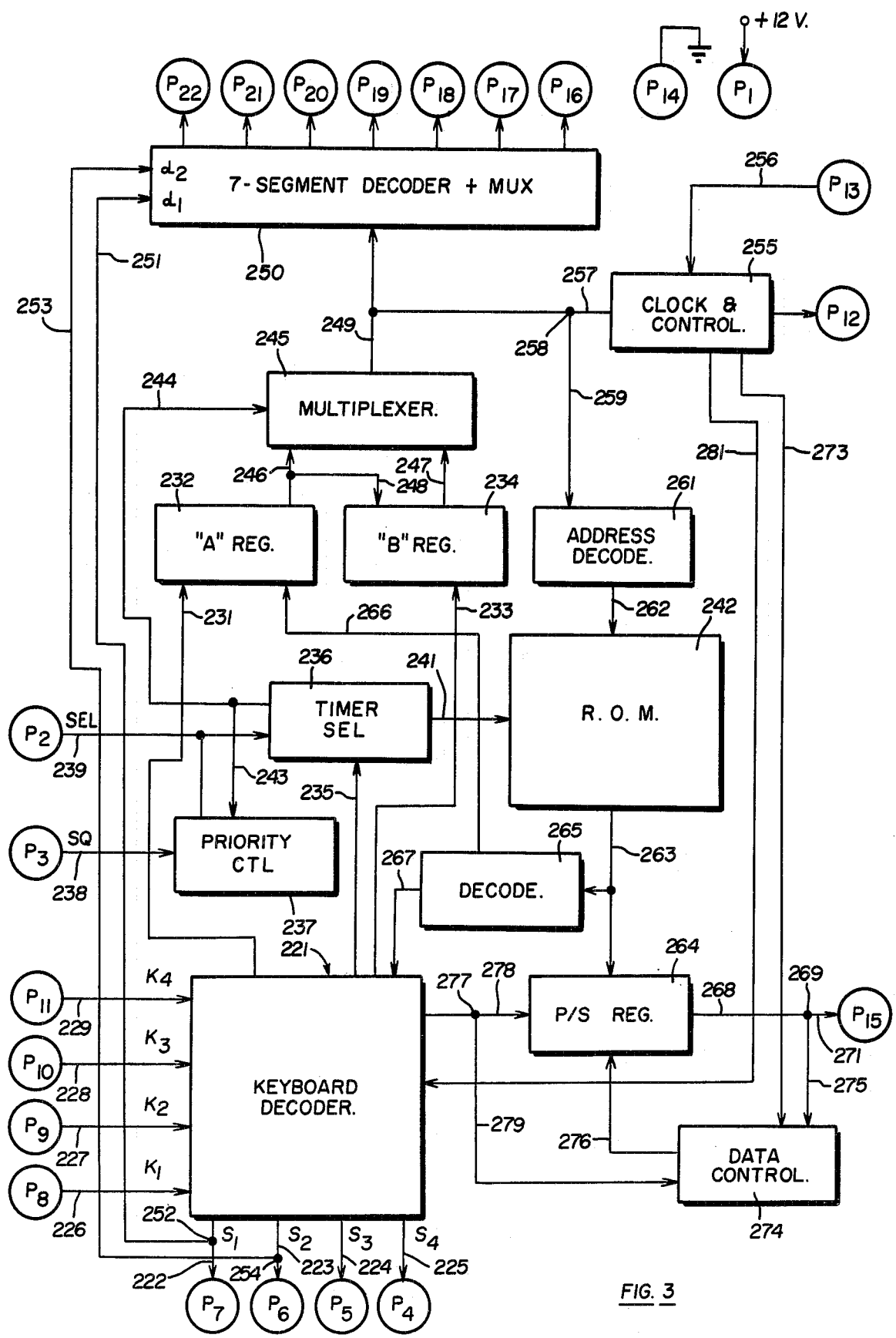
FIG. 3 is an electrical block diagram of the digital control logic of functional block 74 of the circuit of FIG. 2 and illustrates the important channel selection control functions associated with the hand-held combination microphone and control unit of the system of the present invention.
Figure 4:
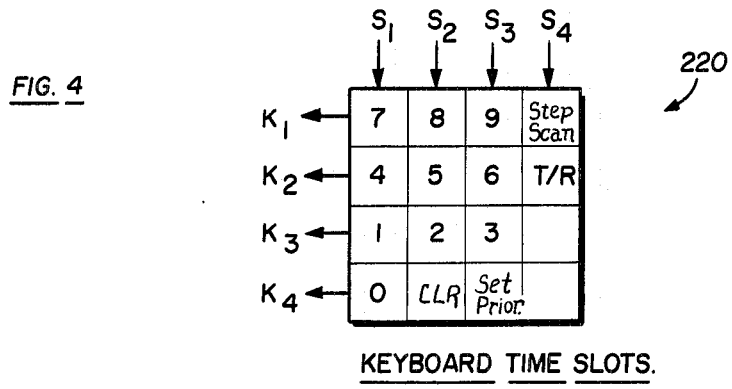
FIG. 4 is a block diagram representation of the keyboard time slots of the 4×4 matrix digital keyboard associated with the keyboard decoder of block 221 of FIG. 3.

In FIG. 3, the control logic chip 101 of FIG. 2 is illustrated as including a conventional keyboard decoder which is associated with a typical conventional keyboard as described with reference to FIG. 4. The keyboard 220 of FIG. 4 shows a 4×4 matrix keyboard with four rows and four columns. The keyboard 220 of FIG. 4 is illustrated as containing the ten decimal digit keys zero through nine respectively and an additional four keys including a clear key, a set priority key, a step scan key, and a transmit/receive (T/R) key. Two of the time slot positions are unused in the preferred embodiment of the present invention and, as conventionally known, each of the keys represents a manually-operable switching means or element whereby information may be entered directly into the system of FIG. 3 via the keyboard decoder circuit 221 thereof. The first column of keyboard time slots are strobed by the signal $S_1$, the second column by the strobe signal $S_2$, the third column by the strobe signal $S_3$, and the fourth and last column by the strobe signal $S_4$. The rows or outputs of the keyboard time slots are designated $K_1$ through $K_4$ and are referred to by corresponding designations on the keyboard decoder circuitry of block 221 of FIG. 3. In all respects, the keyboard 220 of FIG. 4 and the keyboard decoder circuit of block 221 of FIG. 3 are conventional except for the functions attributable to the additional keys previously mentioned, but the decoder operation and function remains unchanged.

The keyboard decoder strobe outputs $S_1$, $S_2$, $S_3$ and $S_4$ are connected via leads 222, 223, 224, and 225, respectively, to output pins $P_7$, $P_6$, $P_5$ and $P_4$ of the IC control logic chip 101 of FIG. 2. Similarly, the keyboard decoder inputs $K_1$, $K_2$, $K_3$ and $K_4$ are connected to the input pins $P_8$, $P_9$, $P_{10}$ and $P_{11}$, respectively, via leads 226, 227, 228, and 229, respectively. The decoded keyboard output may be supplied via either data path 231 to a first or "A" storage register 232 or via data path 233 to a second or "B" storage register 234, depending upon the mode of operation selected. The last output of the keyboard decoder circuit is supplied via lead 235 to the timer select circuitry of block 236 whose function will be described hereinafter. The input pin $P_3$ connects the squelch control input SQ to the priority control circuit of block 237 via lead 238 and the input $P_2$ connects the priority or recall select signal SEL, if it is used, to both the priority control circuit of block 237 and the timer select circuitry of block 236 via lead 239.

One output of the timer select circuitry of block 236 is connected via lead 241 to control the timing in a mask-programmable read-only memory 242 while the other output is connected via lead 243 to the priority control circuit of block 237 and via lead 244 to the control input of a conventional multiplexor circuit 245. The output of the first register 232 is supplied, in BCD form, via data path 246 to the inputs of the multiplexor 245 while the output of the second storage register 234 are supplied, in BCD form, to the inputs of multiplexor via data path 247. Furthermore, the output of the first or "A" storage register 232 may be transferred to the "B" or second storage register 234 via data path 248 for priority monitoring or recall purposes, if desired. The output of the multiplexor of block 245 is supplied via the data path 249 to the inputs of a conventional seven segment decoder and multiplexor circuit 250 whose first digit input $d_1$ is connected via lead 251 to the $S_1$ strobe output of the keyboard decoder 221 via node 252 on lead 222 while the second digit input $d_2$ is connected via lead 253 to the second strobe output $S_2$ of the keyboard decoder 221 via node 254 on lead 223. The seven segment decoder and multiplexor 250 operates in a conventional manner and connects to the output pins $P_{22}$ through $P_{16}$ respectively, which were previously described.

A conventional clock and the control circuitry associated therewith is represented by the block 255 and the $P_{13}$ input supplies the RC oscillator clock signals thereto via lead 256. The clock output is supplied via lead 257 to connect via node 258 to the data path 249 at the output of the multiplexor which feeds the seven segment decoder and multiplexor circuitry of block 250 and the data path 259 which feeds a conventional address decoder circuit.

The output of the address decoder circuitry of block 261 is supplied via data path 262 to address the memory 242 and the output of the memory is supplied in parallel via data path 263 to the inputs of a parallel-to-serial shift register 264, and simultaneously, to a conventional output decoder circuit 265 via the same parallel data paths represented by path 263. One output of the decoder circuit of block 265 is connected via lead 266 to control the operation of the "A" memory register 232 while another output is connected via lead 267 to an input of the keyboard decoder 221 for entry verification.

The serial output of the parallel-to-serial shift register 264 is supplied via lead 268 to an output node 269 and node 269 supplies the sequence of data bits stored in the register 264 to output pin $P_{15}$ via lead 271 in a serial manner on a bit-by-bit basis, as conventionally known, under control of the digital clock 255. Another output of the clock circuit of block 255 is supplied via lead 273 to one input of the data control circuitry of block 274 which has another input connected to the serial shift register output node 269 via lead 275. The output at the data control circuit of block 274 is supplied via lead 276 to the clock input of the parallel-to-serial shift register 264 for controlling the rate at which the information or data is serially shifted therefrom. An output from the keyboard decoder circuit of block 221 is supplied directly to a node 277 which is connected to the parallel-to-serial shift register of block 264 via lead 278 and to the data control circuitry of block 274 via lead 279. Lastly, the third and final output of the clock circuitry of block 255 is connected via lead 281 to a clock input of the keyboard decoder circuit of block 221, as conventionally known.

If the keyboard of FIG. 4 is utilized to enter information into the circuit of FIG. 3, any numerical key depression will be directly entered by the decoder into the units position of the "A" register 232 and will shift any previously entered "units" data into the tens position thereof. Any such entry will also initiate a command via output node 277, lead 278, lead 279, and the data control circuitry of block 274 to cause the parallel-to-serial shift register 264 to serially transmit a previously addressed and entered multibit digital word of data to the frequency synthesizer circuitry of block 72 of FIG. 1 via output pin $P_{15}$ and the serial data transmission lead 76. If the set priority key has been depressed, a decode thereof will cause the contents of the "A" register 232 to be transferred or copied into the "B" register 234 and stored therein for priority scan or recall purposes as hereinafter described. All keyboard entries are automatically debounced internally with the time of 20 to 40 milliseconds and it will be noted that the T/R transmit-receive key also utilizes a keyboard time slot for decoding purposes.

When operated in a scan mode, each depression of the step scan key of FIG. 4 will increment the previously selected channel number by one and each subsequent depression of the step scan key will continue to increment the channel number on a step-by-step basis until the desired channel number is reached. Alternatively, a depression of the step scan key which will initially increment the channel number by one will also, after a one-half second delay, scan all legal channels at a rate of 10 HZ if the step scan key remains depressed and when the desired channel is reached, release of the step scan key will end the scanning unit it is again employed.

The SEL input which, as previously discussed, could utilize a conventional slidably-positionable switch to be which could be manually positioned between a source of potential and ground so as to connect the SEL input $P_2$ to the timer select circuitry of block 236 in the priority control circuitry of block 237 so as to select between a "normal" and a "priority" mode of operation or in a "recall" mode as follows. The SEL input on lead 239 determines the mode of operation. In the normal mode, the SEL input may selects the "A" storage register 232 or to common ground in which case the "B" register 234 is automatically selected. When operating in the priority select mode, the SEL lead 239 is open circuited allowing the timer select circuitry a rate of about one sample per second. If the squelch input on lead 238 goes negative and then back to a positive level during a scanning of the "B" register then the "B" register 234 will be selected and held until SQ again goes negative. In this manner, a priority channel stored in the "B" register 234 is alternatively scanned and should the frequency corresponding to the priority channel stored therein become active, i.e., radio frequency signals corresponding to the selected priority channel are being received by the transceiver due to someone broadcasting on said priority channel, then the "B" register 234 is automatically selected regardless of the last channel select entry into the "A" register 232.

As previously recited, the keyboard of FIG. 4 is arranged into a 4×4 matrix and scanning takes place at a rate of 200 to 400 HZ. Two of the keyboard strobes, $S_1$ and $S_2$ are also used to select the units and tens digits, respectively for the two digit display 148 via leads 251 and 253, respectively, as previously described, and each have a forty percent duty cycle while the other two strobes $S_3$ and $S_4$ each have a ten percent duty cycle. Such keyboard scanning is conventional and may be purchased as an off-the-shelf item from any number of sources.

The memory means 242 may be any conventional type of memory such as a mask-programmable 100×14 ROM which is programmed with a plurality of multibit data words organized generally as follows. Assuming that the CB radio transceiver of the present invention is to be used with the 40 CB channels currently allowed by the FCC, forty different and distinct multibit data words would be stored in the memory, one for each of the forty desired channels.

In the preferred embodiment, each multibit data word contains seventeen bits with each bit having the following function. The first bit is not provided in the memory but serves as a synchronization bit and the second bit may be used as a first auxiliary control function AUX1, but is not currently used in the preferred embodiment of the invention. The third bit is not provided in the memory but indicates whether the apparatus is in the transmit or the receive mode of operation. The fourth bit is another auxiliary bit AUX2 which is not currently used but which may be masked to indicate selection of the "B" register during recall operation or the like. Bits 5 through 10 represent the third, fourth, fifth, sixth, seventh and eighth most significant bits to be fed into the nine stage programmable ÷N counter 307 of the frequency synthesizer circuitry of FIG. 5, as hereinafer described, while the eleventh bit contains the least significant bit fed into the nine stage counter 307. The twelfth, thirteenth, fourteenth and fifteenth data word bits are used to store the fourth most significant bit, third most significant bit, second most significant bit and the least significant bit of four stages of a five stage ÷A counter 335 which will be further described with reference to the circuit of FIG. 5. The sixteenth bit of the programmed data word is a parity bit while the seventeenth bit is yet another sync pulse not provided by the memory. A data word containing all zeroes is used for reset purposes and a data bit sequence of 0000 followed by 11111, 0000 and 1 is used to indicate an illegal channel selection which may be decoded in the circuit 366 of FIG. 5 and used as hereinafter described.

The multibit data control word stored in the memory which corresponds to the CB channel selected by the keyboard or external step scan switch of FIG. 4, is addressed by conventional address decoder circuitry 261 and, at the appropriate time, it is loaded, in parallel, into the seventeen bit positions of a seventeen bit shift register 264. Once the seventeen bits of the properly addressed and selected multibit data control word corresponding to the selected CB channel has been transferred into the parallel-to-serial shift register 264, it is transmitted via the serial output lead 268, node 269, lead 271, pin 15 and the single serial control data line 76 to the frequency synthesizer circuit block 72 as further described with reference to FIG. 5. The serial transmission is initiated upon a transision in the T/R or SEL switch positions; upon an input from the keyboard of FIG. 4 except for set priority; upon a change of register selection generated by operation in the priority mode; by a parity error received via feedback along the data path 76 from the synthesizer circuit 72; upon termination of a reset signal of 20 bits or longer from the synthesizer chip, as hereinafter explained; and at the termination of an increment while operating in the step scan mode previously described.

For reset and testing purposes, all sixteen keys of the keyboard of FIG. 4 down will initialize all counters in the circuit of FIG. 3 to zero and one of the two unused time slots of the keyboard of FIG. 4 may be utilized such that the RC clock can be caused to by-pass the first seven stages of the main counter, if desired.

With this brief description of the structure, operation and functional results achieved by the various blocks of the circuit of FIG. 3, it is respectfully submitted that the circuit can be easily constructed using any of a number of methods of integrated circuit technology or, alternatively, by using commercially available, conventional, off-the-shelf units. For example, the keyboard decoder of block 221 is a standard off-the-shelf item and means for adjusting the duty cycle of the strobe rate are conventional. The clock and control circuitry of block 255 can be readily constructed using AND gates, NOR gates and latches so as to produce a two phase clock output of any desired frequency and a single clock phase output of any desired duty cycle. Likewise, the "A" register 232 and the "B" register 234 would readily be constructed as a conventional BCD counter having four stages for the first channel digit and four stages for the second channel digit and the operation, including the inputting of data thereto and the outputting of data therefrom is conventional and can be implemented by either discrete elements or any number of integrated circuit techniques.

Likewise, the timer and register selection circuitry of block 236 could be configured by simple two phase, clock-operated gating arrangements used to control the operation of a conventional multiplexor 245 which could include, for example, a latching arrangement for receiving the BCD outputs of either the first digit or the second digit of either the "A" register 232 or the "B" register 234 depending upon control signal from the timing select circuitry of block 236. Similarly, the parallel-to-serial shift register 264 could be comprised of a series of "D" flip-flops each having its "D" input connected to a decoded output of the ROM 242 and its "Q" output connected to the next successive flip-flop in conventional shift register fashion.

Appropriate timing signals can be used to control the loading of the register and the shifting of the bits from stage to stage for output purposes. The data and control circuitry of block 274 could, for example, contain two separate multistage shift registers, one for storing the data as it is shifted out of the parallel-to-serial register 264 and another for receiving data transmitted back from the synthesizer circuit of block 72 in the event of a parity error or the like together with appropriate comparison or gating circuitry for controlling retransmission of the data, for error detection purposes, or the like. Lastly, as previously described, the decode and multiplexor circuitry of block 250 for a typical two digit seven segment decoder is a conventional off-the-shelf item and can be constructed in any number of ways, for example via a NOR gate decoding matrix, or the like.

Figure 5:
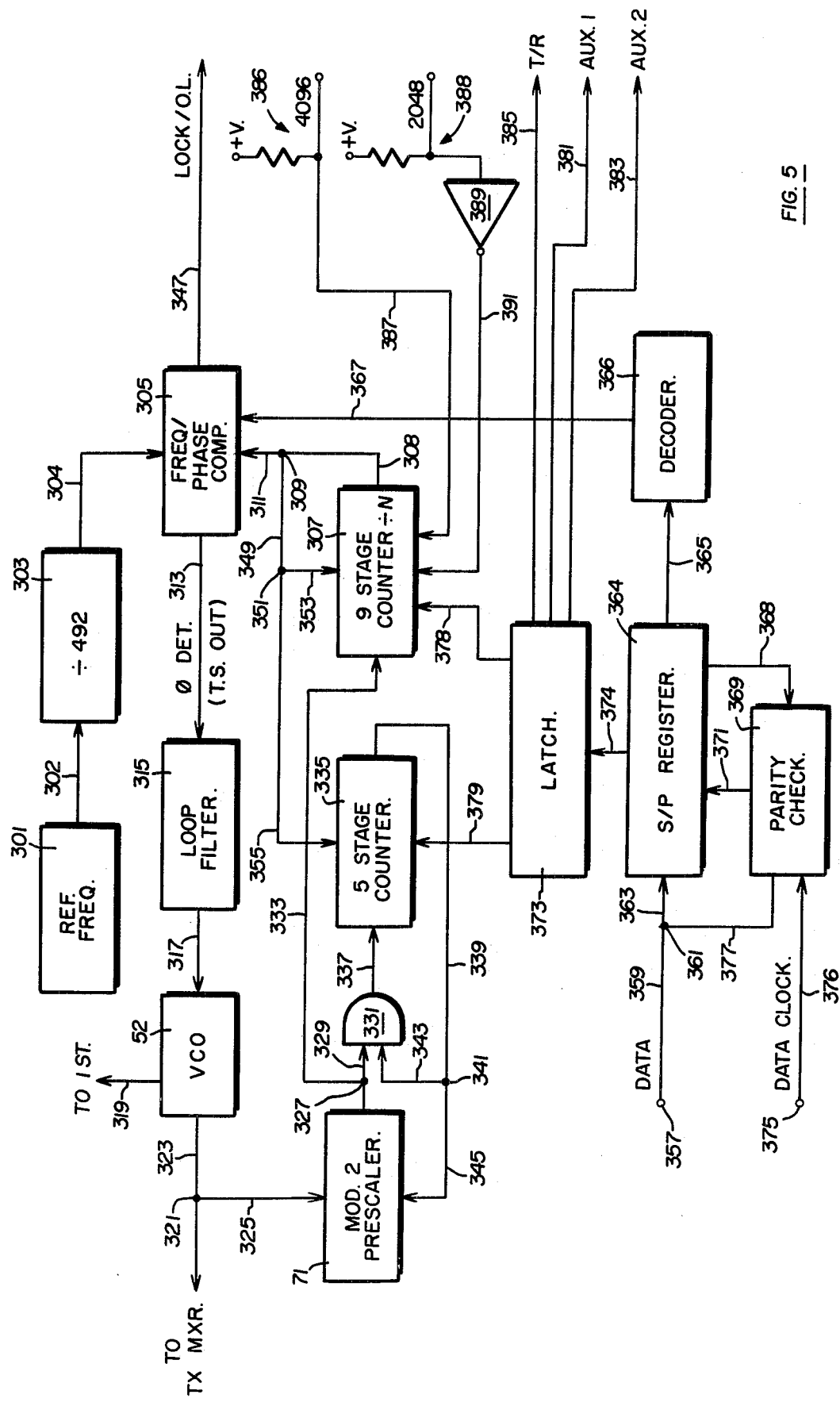
FIG. 5 is an electrical block diagram of the frequency synthesizer circuitry of the present invention including the phase-locked loop circuitry and the modulus-2 prescaler of the block diagram of FIG. 1.

FIG. 5 shows a block diagram of the frequency synthesizer circuit mounted on the chassis 11 of FIG. 1 and generally is described as including the frequency synthesizer circuit of block 72, the reference oscillator circuit of block 73, the VCO circuit of block 52 and the 2-modulus prescaler circuitry of block 71 of FIG. 1.

A reference frequency circuit is illustrated generally by block 301 and, in the preferred embodiment of the present invention, is a highly accurate 2.46 MHZ source of clock pulses. The clock pulses are supplied from the frequency reference via lead 302 to a conventional divide-by-492 counter 303 which, in the preferred embodiment of the present invention, is implemented by a conventional divide-by-4 counter followed by a conventional divide-by-123 counter. The output of the frequency division counter 303 is supplied via frequency reference lead 304 to the frequency reference input of the frequency/phase comparator circuitry of block 305. An output from a nine stage divide-by-N (÷N) counter 307 is supplied via lead 308 to an output node 309 and node 309 supplies the downcounted programmed counter signal to the other input of the frequency/phase comparator 305 via lead 311.

The phase detection output of the frequency/phase comparator 305 is a tri-state output (T.S. OUT) which supplies a control signal via lead 313 to a conventional loop filter 315. The output of the loop filter 315 is connected via lead 317 to the input of a conventional voltage-controlled-oscillator 52. The VCO 52 supplies one output to the first radio receiver mixer 15 via lead 319 and a second output to a node 321 via lead 323. The second output to node 321 is supplied directly to the transmitter mixer 51, as previously described, and is also supplied via lead 325 to the input of a conventional 2-modulus prescaler 71. The output of the 2-modulus prescaler 71 is connected directly to a node 327 and node 327 is connected via lead 329 to one input of a logical AND gate 331 and via lead 333 is connected to the input of the nine stage ÷ N programmable counter 307. The output of the two input AND gate 331 is connected directly to the input of a five stage "A" down-counter 335 via lead 337 and the output of the five stage counter 335 is supplied via feedback lead 339 to feedback node 341. Feedback node 341 is connected via lead 343 to the second input of the logical AND gate 331 and via lead 345 to a control input of the 2-modulus prescaler, as conventionally known. The other output of the frequency/phase comparator circuit of block 305 supplies the Lock/Out-of-Lock control signal to the PA/CB out-of-lock switch or control switch 38 of FIG. 2, as further described in FIG. 6, via lead 347.

Each of the basic elements of the phase-locked loop comprising the frequency synthesizer circuitry, the loop filter 315, the VCO 52, and the 2-modulus prescaler 71 and the circuitry associated therewith including the nine stage divide-by-N counter 307, often referred to as the programmable counter, and the five stage counter, which is often referred to as a divide-by-A counter are conventional. For a typical description of the apparatus and operation of a frequency synthesizer using a 2-modulus prescaler and a phase-locked loop, reference is hereby made to the textbook "Frequency Synthesizers--Theory and Design" by V. Manassewitsch, published by John Wiley and Sons, New York, 1976, which is incorporated by reference herein, and to any number of articles describing the implementation of a phase-locked loop frequency synthesizer using a variable modulus prescaler such as a Motorla MC12012 along with a programmable counter such as an MC12014 to produce an output frequency $f_o$ such that $f_o = N_T \cdot f_{ref}$. In this equation, $f_{ref}$ equals the divided down reference frequency inputted to the phase comparator 305 via lead 304 and the number N represents the total division factor where $N_T = (P+1)A + P(N-A)$ where P and P+1 are the dividing factors of the prescaler; N is a dividing factor of the counter 307, and A is the dividing factor of the counter 335.

The output of the nine stage counter 307 which is supplied to node 309 is also supplied via lead 349 to a node 351, and node 351 supplies this signal to a control input of the nine stage counter 307 via lead 353 and to the control input of the five stage counter 335 via lead 355.

The individual, serially-transmitted bits of the seventeen bit word addressed in the memory 242 and serially outputted from the parallel-to-serial register 264 from pin $P_{15}$ via the serial data path 76. The serial bits of the addressed data control word are received at input node 357 and supplied via lead 359 to data input node 361. Input node 361 is supplied via lead 363 to the data input of a conventional serial-to-parallel shift register 364. One output of the parallel-to-serial shift register 364 is connected via lead or data path 365 to a decoder network 366 for detecting certain illegal or out-of-lock conditions and transmitting a signal indicative thereof to the frequency/phase comparator 305 via lead 367. The parity bits received and stored in the serial-to-parallel shift register 364 are supplied via lead 368 to a parity check circuit represented by block 369 which transmits an authorization to transfer signal or a parity error signal to the serial-to-parallel shift register 364 via lead 371 to allow the stored contents of the serial-to-parallel shift register 364 to be transferred, in parallel, to the latching register of block 373 via parallel data path 374 in the absence of a parity error.

The data clock pulses from pin $P_{12}$ of the clock 255 of FIG. 3 are transmitted via the data clock lead 75 to data clock input node 375 and thence via lead 376 to the input of the parity check circuit 369. The data clock signals are used to synchronize the shifting of the data within the serial-to-parallel shift register 364. The parity check circuitry of block 369 is conventional and if a parity error is detected, the data in the serial-to-parallel shift register 364 will be caused to be transmitted serially back to the register 364 of FIG. 3 via the I/O data node 357 and a serial data transmission lead 76 by the generation of a parity error signal.

The circuitry of the latch 373 is conventional and is used to temporarily store the multibit control word entered into the serial-to-parallel register 364 in the absence of the detection of a parity error or the like. Certain bits of the seventeen bit control word stored in the latch 373 are used to generate various outputs as follows. As previously indicated, the values stored in bit positions five through eleven are used to preset the seven least significant stages of the nine stage divide-by-N counter 307, as conventionally known, via data path 378 and the values stored in bit positions 12-15 are decoded and used to preset an initial count in the five stage counter 355 via input data path 379 although the operation of the five stage counter is controlled by the 2-modulus prescaler configuration previously described.

Furthermore, the value stored in the second bit position supplies the first auxiliary control signal AUX1 to an AUX1 output via lead 381 while the value of the fourth bit position transfers the AUX2 signal out via output lead 383 and the value of the third bit position indicates whether the system is operating in the transmit or the receive mode and this signal is supplied to the T/R output via lead 385.

The most significant bit position of the nine stage divide-by-N counter 307 is pre-programmed with the count 4096 via the input circuitry referred to generally by reference numeral 386 which is supplied thereto via lead 387 while the next most significant bit position of the initial count stored in the nine stage counter 307 is pre-programmed with the 2048 count via the circuit arrangement referred to by the reference numeral 388 via inverter 389 and lead 391.

The synthesizer circuitry and phase-locked loop of the circuit of FIG. 5 will not be described in great detail since, as indicated above, the basic structure and operation thereof is conventional. In the preferred embodiment of the present invention, both the five stage divide-by-A counter 335 and the nine stage divide-by-N counter 307 are adapted to count on the 0 to 1 or leading edge transision of a 2.5 MHZ clock input. The nine stage programmable counter 307 downcounts according to a cycle 504−M where M is the preset number programmed in the memory 242 of the hand-held combined microphone and control unit 12 of FIG. 1 and which is supplied to the various stages of the counter 307 from the previously described bit positions of the data control word stored in the latch 373 via data path 378. Similarly, the five stage counter is loaded with a given number from the specified bit positions of the data control word stored in the latch 373 via data paths 379 and down counts to a terminal count of A where A is the preloaded number from the ROM+12 after which the counter remains at its terminal count until reloaded with a new number from the appropriate bit positions of the latch 373.

As previously described, the data control word is received serially at input 357 and shifted sequentially into the seventeen bit serial-to-parallel shift register 364, as conventionally known. At the end of reception, the entire data word is loaded, in parallel, into the latching register 373 via data path 374 if there is no parity error. If a parity error is present, the information is transmitted back to the control logic circuit of FIG. 3 via the original serial data path 76 after the shift register 364 is cleared, which involves a seventeen bit delay.

The tri-state phase comparator and lock outputs of the frequency comparator of 305 operate briefly as follows. The lock output 347 is in the locked condition, or low, whenever the tri-state phase comparator output is floating, and is in the out-of-lock condition or high whenever there is a parity error or an illegal channel entry has been made or whenever the tri-state phase comparator output is not floating. A power-on reset involves the use of an external capacitor which supplies a reset signal longer than 20 bits via the parity control circuit of block 369 which is transmitted via lead 377, node 361, lead 359, I/O node 357 and the data path 76 back to the control circuit of FIG. 3 for resetting same.

Figure 6:
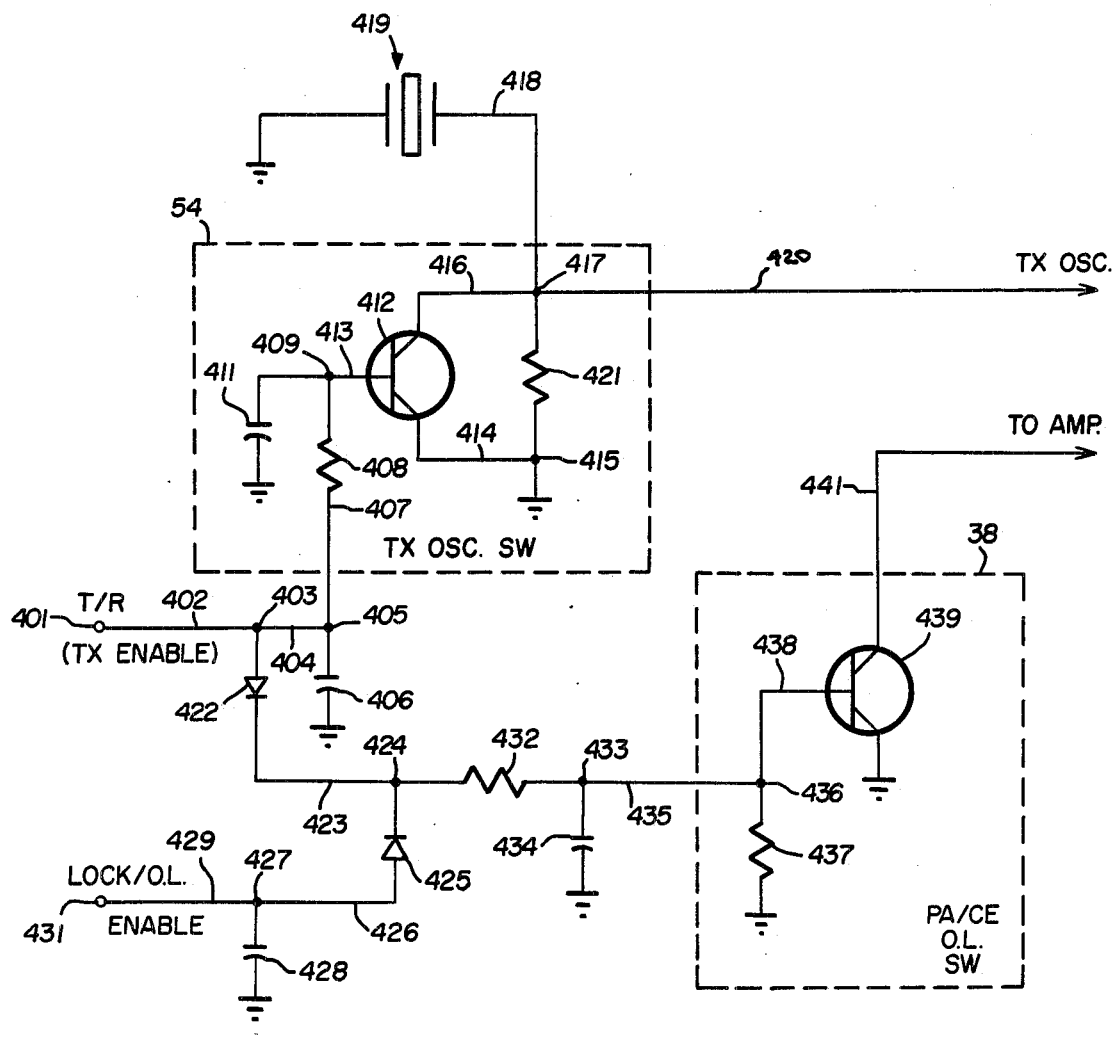
FIG. 6 is an electrical schematic diagram of the transmit oscillator TX switch and PA/CB out-of-lock switch of blocks 54 and 38, respectively, of the block diagram of FIG. 1 as they relate to the frequency synthesizer circuitry of FIG. 5.

FIG. 6 illustrates the transmitter oscillator switch of block 54 of FIG. 1 and the PA/CB out-of-lock switch of block 38 of FIG. 1 as they inter-relate to the control outputs of the circuit of FIG. 5. The T/R output of the latching register 373 is supplied via lead 385 to input node 401 which is also referred to as the T/R input or TX enable input. Node 401 is connected via lead 402 to an input node 403. Node 403 is connected via lead 404 to a node 405 which is connected through a capacitor 406 to ground. Node 405 is also connected via input lead 407 to one terminal of a resistor 408 which opposite terminal is connected to a base input node 409. Base input node 409 is coupled to ground through a capacitor 411 and to the base electrode of a transistor 412 via lead 413.

The switching transistor 412 has its emitter electrode connected via lead 414 to a grounded node 415 and its collector electrode connected via lead 416 to an output node 417. Node 417 is connected via lead 418 to one terminal of a highly accurate crystal oscillator 419 whose opposite terminal is connected directly to ground. The crystal oscillator 419 is a conventional 10.295 MHZ crystal which is a commercially available off-the-shelf item. Node 417 is also connected to one terminal of the resistor 421 which opposite terminal is connected to the grounded node 415. Furthermore, node 417 is connected via lead 418 to supply the oscillator output signal to the transmitter oscillator of block 53 of FIG. 1 as previously described.

The TX enable node 401 is also connected via lead 402 and node 403 to the anode of a diode 422 whose cathode is connected via lead 423 to a node 424. Node 424 is connected to the cathode of another diode 425 whose anode is connected via lead 426 to an input node 427. Input node 427 is capacitively coupled to ground through a capacitor 428 and via lead 429 to a lock/out-of-lock enable input terminal 431. The input terminal 431 receives the lock/out-of-lock signal from the frequency/phase comparator circuit of block 305 of FIG. 5 via lead 347 as previously described.

The common input node 424 is also connected through a resistor 432 to a node 433 which is capacitively coupled to ground through a capacitor 434. Node 433 is also connected via lead 435 to the input of the PA/CB out-of-lock switch of block 38 of FIG. 1 as previously described. Lead 435 connects node 433 to base node 436. Base node 436 is connected via resistor 437 to ground and via lead 438 to the base electrode of a switching transistor 439. The emitter electrode of transistor 439 is connected directly to ground and the collector is connected via lead 441 to the control input of the buffer amplifier 56 of FIG. 1 as previously described.

In operation, when the frequency synthesizer circuit of FIG. 5 has the T/R output or TX enable output of lead 385 high (indicating a receive mode of operation) to disable the transmit mode of operation, a high appears at the input node 401 of FIG. 6 and this high is transmitted via lead 402, node 403, node 405, lead 407, resistor 408, node 409 and lead 413 to the base electrode of the TX oscillator switching transistor 412. With a high present at node 409, switching transistor 412 is rendered conductive to pull the TX oscillator output node 417 low thereby disabling the transmitter oscillator by grounding the signal from the crystal oscillator 419 via lead 418, node 417, lead 416, the now-conducting transistor 412, lead 414 and the grounding node 415.

Simultaneously, the high from input 401 is also supplied via lead 402, node 403, diode 422, lead 403, node 424, resistor 432, node 433, lead 435, node 436 and lead 438 to the base of the PA/CB out-of-lock switching transistor 439 causing transistor 439 to switch to a conductive state. When transistor 439 conducts, the output lead or collector 441 is pulled to ground which disables the bias input to the buffer amplifier 56 thereby preventing an output therefrom and hence preventing transmission.

Conversely, when the T/R signal is low, indicating that the apparatus is in the transmit mode of operation, a low will appear at the base of switching transistor 412 rendering it non-conductive and allowing the crystal 419 to pass its output signals via lead 418, node 417 and lead 420 to the transmitter oscillator of block 53 of FIG. 1 to enable operation of the transmitter mixer 51 and therefore speech transmission. Similarly, a low at node 401 signifies a low at the base of transistor 439 meaning that the switching transistor 439 is in the non-conductive state so that the collector or lead 441 is normally high. A high on lead 441 will be supplied via lead 57 to enable the biasing input of the buffer amplifier 56 so that amplifier 56 can output the RF transmission signals to the RF drivers of 61, 62 and 63 thereby enabling transmission to take place.

Lastly, it will be noted that the frequency/phase comparator circuit 305 outputs a high signal on lead 347 whenever the phase-locked loop is operating in the out-of-lock state and a low signal whenever the phase-locked loop is operating in a properly locked state. The high signal, indicating an out-of-lock state, is supplied from lead 347 of FIG. 5 to the lock/out-of-lock input node 431 of FIG. 6 and thence via lead 429, node 427, lead 426, diode 425, node 424, resistor 432, node 433, lead 435, node 436, and lead 438 to the base of the switching transistor 439. A high at the base of transistor 439 will switch the transistor 439 to a conductive state and cause the collector output lead 441 to be pulled to ground. Since the output lead 441 is connected as by lead 57 of FIG. 1 to the bias enabling input of the buffer amplifier 56, the buffer amplifier is disabled so long as the out-of-lock condition persists.

On the other hand, when the phase-locked loop circuit of FIG. 5 is operating properly, the signal on lead 347 is low and this low is supplied to lock/out-of-lock node 431 on the circuit of FIG. 6. A low at node 431 will be supplied to the base of transistor 439 and the transistor will be maintained in the normally non-conductive state. Therefore, the collector lead 441 will not be pulled to ground and the normal biasing input of the buffer amplifier 56 will be enabled thereby allowing the amplifier to operate and to render transmission possible so long as the phase-locked loop continues operating in the locked condition.

With this detailed description of the specific apparatus used to illustrate the preferred embodiment of the present invention and the operation thereof, it will be obvious to those skilled in the art that various modification can be made in the various implementations of specific functional blocks thereof and in the specific circuitry associated therewith without departing from the spirit and scope of the present invention which is limited only by the appended claims.

We claim:

1. A mobile citizens band transceiver comprising:
a chassis adapted to be installed in a remote location in a motor vehicle such as under the dashboard or seat or in the trunk thereof, or the like, so as to reduce the possibility of theft or the likelihood that the chassis could cause injury to the occupants of the vehicle in the event of an accident or sudden stop;
frequency synthesizer means mounted on said chassis and including phase-locked loop circuit means responsive to give channel selection control signals for generating and precisely maintaining predetermined desired radio channel frequencies;
receiver circuitry means mounted on said chassis for receiving a plurality of radio frequency signals at said predetermined radio channel frequencies and for converting said radio frequency signals into audio frequency electrical signals;
transmitter circuitry means mounted on said chassis for converting input audio frequency electrical signals into radio frequency signals to be transmitted at any one of said plurality of predetermined desired radio channel frequencies;
serial-to-parallel register means responsive to a given serially-received multibit signal pattern for generating a corresponding given channel selection control signal for operating said frequency synthesizer means;
a separate control means of a size which may be selectively held and operated in a person's hand, said separate control means being mounted in a position within easy reach of the person operating the motor vehicle, said separate control means including;
means for storing a plurality of multibit signal patterns representative of a plurality of said predetermined desired radio channel frequencies;
manually-operable channel-selection means for selecting any one of said plurality of predetermined radio channel frequencies;
means responsive to said manually-operable channel-selection means for addressing a selected one of said multibit signal patterns indicative of a corresponding one of said predetermined desired radio channel frequencies;
parallel-to-serial register means for receiving said addressed multibit signal pattern in parallel from said storage means and for outputting said selected multibit signal pattern sequence in a serial manner; and
connector means electrically coupling said separate control means to said remotely located chassis for serially transmitting said outputted multibit signal pattern sequence to said serial-to-parallel register means of said frequency synthesizer means thereby significantly reducing the size of the electrical cable and the number of connecting wires normally required for the parallel transfer of channel selection data between said control means and said frequency synthesizer means.

2. The mobile citizens band transceiver of claim 1 wherein said hand-held separate control means includes channel-indicating means carried thereby for visually displaying the predetermined desired radio channel selected by said manually-operable channel-selection means.

3. The mobile citizens band transceiver of claim 2 wherein said channel-indicating means includes a two digit visual display means for illuminating and visually displaying the digital channel number corresponding to said selected radio channel frequency.

4. The mobile citizens band transceiver of claim 1 wherein said separate hand-held control means includes a manually operable T/R switching means for manually selecting one of either a transmit mode of operation or a receive mode of operation.

5. The mobile citizens band transceiver of claim 4 wherein said separate hand-held control means further includes a manually-operable volume control means and a manually-operable squelch control means and wherein said electrical connector means includes means for electrically coupling said volume control means and said squelch control switching means to said receiver and transmitter circuitry means mounted on said chassis for selectively varying the operation thereof.

6. The mobile citizens band transceiver of claim 4 wherein said separate hand-held control means further includes transducer means including a microphone circuit unit responsive to the position of said T/R switching means for controlling the operation thereof, said microphone circuit unit being further adapted for receiving audio frequency electrical signals and serving as an audio output speaker.

7. The mobile citizens band transceiver of claim 1 wherein said separate hand-held control means further includes a data clock for generating a sequence of clock pulses, wherein said parallel-to-serial register means is responsive to said sequence of data clock pulses for controlling the rate at which said serial sequence of multibit signal patterns of control data are outputted therefrom, wherein said electrical connector means includes means coupling said data clock to said frequency synthesizer means, wherein said frequency synthesizer means further includes means associated with said serial-to-parallel register means and responsive to said data clock pulses for controlling the operation thereof to synchronize said clock pulses with the sequential arrival of the multibit signal patterns outputted from said parallel-to-serial register means of said separate hand-held control means for error prevention purposes.

8. The mobile citizens band transceiver of claim 1 wherein said manually-operable channel-selection means includes a digital keyboard means for manually entering a selected channel number corresponding to one of said predetermined desired channel frequencies.

9. The mobile citizens band transceiver of claim 1 wherein said manually-operable channel selection means includes a manually-operable switching means for selectively stepping from one channel to the next adjacent channel with each sequential manual depression thereof until a predetermined desired channel frequency is reached.

10. The mobile citizens band transceiver of claim 9 wherein said manually-operable switching means for selectively stepping from channel to channel is responsive to a continuous depression thereof for automatically cycling from one channel to another in a sequential manner until the desired predetermined channel is reached and the manually-operable switching means is released for selecting said predetermined desired radio channel frequency.

11. The mobile citizens band transceiver of claim 1 wherein said means for storing a plurality of multibit signal patterns representative of said plurality of predetermined desired radio channel frequencies includes a programmable memory for storing said plurality of multibit signal patterns indicative of said predetermined desired channel frequencies, said memory being selectively programmable for altering one or more of said multibit signal patterns and storing said altered one or more multibit signal patterns representative of one or more correspondingly different predetermined desired radio channel frequencies.

12. The mobile citizens band transceiver of claim 11 further including a second memory means for storing a predetermined multibit signal pattern indicative of a preselected priority channel frequency and wherein said separate hand-held control means further includes priority channel monitoring means for automatically sampling the frequency of said priority channel stored in said second memory means at a periodic rate to automatically switch said receiver circuitry to said stored priority channel frequency if said channel frequency becomes active.

13. The mobile citizens band transceiver of claim 11 further including separate and distinct memory means for storing a multibit signal pattern indicative of a predetermined recall channel frequency and wherein said separate hand-held control means further includes manually-operable means for by-passing said normal channel selecting means and automatically selecting said stored recall channel frequency stored in said separate and distinct memory means.

14. The mobile citizens band transceiver of claim 1 wherein said transmitter circuitry means mounted on said chassis includes a semi-conductor series modulator for permitting the receiver and transmitter modulator functions to be completely separated thereby eliminating the need for either high level audio switching on said separate hand-held control means or the use of a relay means to switch the audio portion of said receiver circuit means without requiring an expensive and bulky modulation transformer means.

15. A multichannel mobile CB radio system adapted to be operatively installed in a motor vehicle comprising a transceiver means adapted to be mounted in a remote location on the motor vehicle such as in the trunk, behind the dashboard, under the seat, or the like, and a hand-held combination microphone and control unit mounted for easy access to the operator of the CB radio system, said hand-held microphone and control unit including housing means of a size so as to be capable of being held in the vehicle operator's hand, microphone means for converting audio sound signals into audio electrical signals for transmission purposes, and control means; said control means including (a) memory means for storing a plurality of multibit digital words each of which corresponds to a predetermined discrete radio channel frequency; (b) channel selection means for selecting a predetermined one of said plurality of stored digital words; and (c) means for serially transmitting the individual bits of said selected stored digital word to said remotely located transceiver means; and said transceiver means including a radio transmitter means; a radio receiver means; and a frequency synthesizer means including a phase-locked loop circuit means for generating and maintaining said predetermined selected radio channel frequency, said phase-locked loop circuit means including (a) means for serially receiving and temporarily storing said selected digital word transmitted by said control means, (b) counter means responsive to one or more bits of said temporarily stored digital word for establishing an initial count number and being operable for controllably counting up or down therefrom, (c) means for generating a predetermined reference frequency, (d) phase comparator means having a first input coupled for receiving said generated predetermined reference frequency, a second input, and an output for generating a phase detection control signal, (e) a voltage-controlled oscillator responsive to said generated phase detection control signal for outputting a precisely controlled radio channel frequency signal to said radio transmitter means, and (f) means responsive to the output of said voltage-controlled oscillator for controlling the counting of said counter means from said initially stored number and for outputting a programmed channel frequency control signal to the second input of said phase comparator means for completing the phase-locked loop control circuit.

16. The multichannel mobile CB radio system of claim 15 wherein said memory means for storing said plurality of multibit digital words is mask-programmable for selectively altering the digital words stored therein and therefore the predetermined discrete radio channel frequencies corresponding thereto.

17. The multichannel mobile CB radio system of claim 15 wherein said channel selection means includes manually-operable means for controlling the selection of the desired one of said plurality of selected radio channels, said manually-operable means includes a keyboard for entering the selected channel number one decimal digit at a time.

18. The multichannel mobile CB radio system of claim 15 wherein said channel selection means includes manually-operable means for controlling the selection of the desired one of said plurality of predetermined radio channels, said manually-operable means including a depressible switching means which automatically steps to the next successively numbered channel with each manual depression thereof so as to operate in a step-by-step manner.

19. The multichannel mobile CB radio system of claim 18 wherein said manually-operable depressible switch remains operable when in the depressed position for automatically and continually scanning successive channels in a step-by-step manner until said switch is released.

20. The multichannel mobile CB radio system of claim 15 wherein said channel selection means includes manually-operable means for controlling the selection of a desired one of said plurality of predetermined radio channels and said channel selection means further includes addressing means responsive to the operation of said manually-operable means for selecting a corresponding one of said stored digital words and outputting said stored word in parallel from said memory means to said serial transmission means.

21. The multichannel mobile CB radio system of claim 20 wherein said means for serially transmitting the individual bits of said selected stored digital word to said remotely located transceiver means includes a parallel-to-serial shift register adapted to receive, in parallel, the selectively addressed word from said memory means for temporary storage therein and electrical connector means connecting the output of said parallel-to-serial shift register to said transceiver means for transmitting the individual bits of said selected word serially to said transceiver means.

22. The multichannel mobile CB radio system of claim 15 wherein said microphone means also serves as an audio speaker means and wherein said control means includes manually-operable means for selecting either a transmit or a receive mode of operation, manually-operable means for DC volume control and manually-operable means for DC squelch control.

23. The multichannel mobile CB radio system of claim 22 wherein said control means yet further includes first and second memory registers, said first memory register being normally operable for receiving the manually entered channel selection data while said second memory register is operable for selectively storing a priority channel designation.

24. The multichannel mobile CB radio system of claim 23 wherein said control means further includes means for selectively recalling the priority channel designation stored in said second memory register means regardless of the channel most recently selected by said channel selection means.

25. The multichannel mobile CB radio system of claim 23 wherein said control means further includes a priority sampling control means for monitoring the priority channel designation stored in said second register means at a periodic rate and circuit means for switching to said priority channel regardless of said most recently selected channel whenever said priority channel becomes active.

26. The multichannel mobile CB radio system of claim 15 wherein said hand-held housing includes a two digit visual display of the selected channel frequency and means for time multiplexing said two digit display with said control means to minimize the interconnections therebetween.

27. In the combination of a transducer and control unit adapted to be coupled by a multi-conductor cable to a separate radio transceiver chassis which is capable of transmitting and receiving a plurality of radio signals at preselected frequencies, said combination transducer and control unit comprising a housing of a size which is conveniently adapted to be held by one hand, a multi-conductor cable secured to said housing and adapted to electrically connect said combination transducer and control unit to said radio transceiver chassis, a manually positionable transmit/receive switching means mounted in said housing and connected to said multi-conductor cable for selectively enabling said transceiver to transmit or receive said radio signals, volume control means mounted on said housing and coupled to said multi-conductor cable and said transducer for varying the amplitude of the audio frequency electrical signal produced by said transducer, control circuit means, manually-operable channel-selecting means mounted on said housing and coupled to said control means for selecting the desired one of said plurality of preselected radio frequencies at which said transceiver is to function, and frequency synthesizer means responsive to said control means for generating said selected desired radio frequency signal, the improvement comprising the remote separation of said control means from said frequency synthesizer means such that said control means comprises digital circuit means housed within said transducer and control unit while said frequency synthesizer means is housed proximate said remotely located separate radio transceiver chassis, said control means including memory means for storing a plurality of words of control data, each of said words of data representing one of said predetermined channel frequencies, said control means further including means responsive to said manually-operable channel selection means for addressing the selected word of data stored in said memory and serially transmitting said word of data to said frequency synthesizer means, said frequency synthesizer means including means for serially receiving said transmitted word of data and means including a phase-locked loop control circuit responsive to said serially received word of control data for synthesizing said preselected desired radio channel frequency.

* * * * *